United States Patent [19]
Willard et al.

[11] Patent Number: 6,125,434
[45] Date of Patent: Sep. 26, 2000

[54] DYNAMIC MEMORY RECLAMATION WITHOUT COMPILER OR LINKER ASSISTANCE

[75] Inventors: Brian Alan Willard, Palm Bay; Ophir Frieder, Melbourne, both of Fla.

[73] Assignee: Northorp Grumman Corporation, Los Angeles, Calif.

[21] Appl. No.: 09/081,359

[22] Filed: May 19, 1998

[51] Int. Cl.[7] ................................................. G06F 12/02
[52] U.S. Cl. ........................................ 711/170; 707/206
[58] Field of Search ................................. 711/170, 171, 711/172, 173; 707/205, 206

[56] References Cited

U.S. PATENT DOCUMENTS

| | | | |
|---|---|---|---|
| 4,755,939 | 7/1988 | Watson | 364/300 |
| 5,136,706 | 8/1992 | Courts | 395/600 |
| 5,355,483 | 10/1994 | Serlet | 395/650 |
| 5,485,613 | 1/1996 | Engelstad et al. | 395/650 |
| 5,535,390 | 7/1996 | Hildebrandt | 395/700 |
| 5,560,003 | 9/1996 | Nilsen et al. | 395/600 |
| 5,561,785 | 10/1996 | Blandy et al. | 395/497 |
| 5,572,730 | 11/1996 | Oda | 395/616 |
| 5,604,902 | 2/1997 | Burkes et al. | 395/622 |
| 5,652,883 | 7/1997 | Adcock | 395/622 |
| 5,687,368 | 11/1997 | Nilsen | 395/614 |
| 5,689,707 | 11/1997 | Donnelly | 395/622 |

OTHER PUBLICATIONS

"Large Scale Information Retrieval Systems: Resolving Memory Leaks in Non–Cooperative Server Applications", Brian A. Williard, Ph.D. charts from thesis defense dated Feb. 16, 1998, Florida Institute of Technology, pp. 1–62.

"Large Scale Information Retrieval Systems: Resolving Memory Leaks in Non–Cooperative Server Applications", Brian Willard and Ophir Frieder, Jan. 6, 1998, pp. 1–36.

"A garbage collector for C and C++", ftp://parcftp.xerox.com/pub/gc/gc.htmal.

"C Interface", GC library,http://reality.sgi.com.boehm_mti/gcinterface.html.

*Primary Examiner*—Kevin L. Ellis
*Attorney, Agent, or Firm*—Terry J. Anderson; Karl J. Hoch, Jr.

[57] ABSTRACT

A method of dynamic memory reclamation for reclaiming memory leaks is disclosed, in which inaccessible heap segments are reclaimed without recompilation or relinkage of an application. The method comprises intercepting a call from an application to allocate or deallocate a heap segment, forwarding the call to the memory manager, passing the memory allocation and deallocation information from the memory manager to a file, performing a conservative garbage collection process using the memory allocation and deallocation information in the file to detect inaccessible heap segments, and calling to the memory manager from the file to deallocate the inaccessible heap segments. These steps are repeated periodically.

7 Claims, 2 Drawing Sheets

DYNAMIC MEMORY RECLAMATION WITHOUT COMPILER OR LINKER ASSISTANCE

FIELD OF THE INVENTION

This invention relates generally to a method for dynamic memory management in a computer, and more particularly to a method of dynamic memory reclamation that detects and reclaims memory leaks without recompiling or relinking an application.

BACKGROUND OF THE INVENTION

Computer systems may manage computer memory dynamically. Dynamic memory management refers to the process by which blocks of memory are allocated temporarily for a specific purpose and then deallocated when no longer needed for that purpose. Deallocated blocks are available for reallocation for another purpose. The process that dynamically manages the memory is referred to as the memory manager. The memory that the memory manager manages is referred to as a "heap." When an application program needs a block of memory to store data, the program sends a request to the memory manager. The memory manager allocates a block of memory in the heap to satisfy the request and sends a pointer to the block of memory to the program. The program can then access the block of memory through the pointer.

In the case of programs written in certain languages, such as C++, blocks of memory can be allocated automatically or dynamically. Automatic memory blocks are automatically allocated when a procedure is entered and automatically deallocated when the procedure is exited. Conversely, dynamic memory blocks are allocated by an explicit call to the memory manager and deallocated by either an explicit call to the memory manager or automatically through a memory reclamation technique known as garbage collection. Typically, automatically allocated memory blocks are stored in a stack and dynamically allocated memory blocks are stored in a heap.

A program can only access a dynamic memory block through a pointer. A pointer is a memory location that contains the address of an allocated (or used) heap segment. If the program overwrites a pointer, then the corresponding heap segment becomes "inaccessible" to the program. An allocated heap segment may be pointed to by several pointers, located on the stack or in another allocated heap segment. Only when all the pointers are overwritten, or are part of another inaccessible heap segment, does the heap segment become inaccessible. A program cannot retrieve data from or write data to an inaccessible heap segment. These inaccessible allocated heap segments are known as memory leaks.

For efficient memory usage, inaccessible heap segments must be "reclaimed" so that they can be reallocated. The identification and reclaiming of inaccessible heap segments is known as garbage collection. A system or method for performing garbage collection is referred to as a garbage collector. The first garbage collector developed was the reference counting algorithm. It is based on counting the number of active references to dynamically allocated objects to determine which objects are inaccessible. The mark/sweep algorithm was developed at about the same time. Mark/sweep is a tracing algorithm and relies on global traversal of all allocated objects to determine the inaccessible objects.

Another garbage collector is the copying algorithm. This collector divides the heap equally into two parts. One part contains current data and the other old data. The algorithm traverses all active objects in the current data part, copies them to the other part, leaving the inactive objects uncopied. After all active objects have been traced, the roles of the two parts are swapped. Generational and incremental garbage collectors are designed to improve the performance of garbage collection, making it feasible in real-time applications. The idea behind generational garbage collection is that most objects die young. The algorithm segregates objects by age in two or more generations of heap, and concentrates effort on reclaiming those objects most likely to be garbage, i.e., young objects. Incremental algorithms decrease the length of garbage collection pauses by interleaving small amounts of collection with the real-time application program's execution. Many different embodiments of these collectors can be found in the prior art. However, implementing these collectors requires recompiling or relinking the application. Thus there is a need for a system and method for dynamic memory reclamation without recompiling or relinking the application program.

Servers in large scale information retrieval systems cannot long endure even small memory leaks because of their massive input/output demands. Memory leaks are significantly enhanced because information retrieval systems demand massive caching of massive data. A small memory leak per transaction could exhaust the available memory in a matter of days. Many existing information retrieval systems are implemented in C or C++. These languages do not automatically reclaim dynamically allocated memory, and some level of memory leaks inevitably go undetected despite high quality, meticulous programming. Thus, there is a need for a system and method for reclaiming memory leaks without programmer assistance.

There are many available tools to perform memory reclamation in the prior art. These tools require at least one of the following: compiler assistance, source code instrumentation, add-on utilities that must be linked with the application, and replacing elements in the language memory manager. Compiler assistance and source code instrumentation can be very effective in garbage collectors, however, source code and/or a build environment is often not available for a particular application. Relinking applications to include add-on utilities may change the execution of an application, asking previously manifest defects or introducing new ones. Thus, there is a need for a system and method for reclaiming memory leaks without recompiling or relinking an application program.

SUMMARY OF THE INVENTION

A method of dynamic memory reclamation for reclaiming memory leaks is disclosed, in which inaccessible heap segments are reclaimed without recompilation or relinkage of an application. The method comprises intercepting a call from an application to allocate or deallocate a heap segment, forwarding the call to the memory manager, passing the memory allocation and deallocation information from the memory manager to a file, performing a conservative garbage collection process using the memory allocation and deallocation information in the file to detect inaccessible heap segments, and calling to the memory manager from the file to deallocate the inaccessible heap segments. These steps are repeated periodically.

In the preferred embodiment, the conservative garbage collection process comprises a conservative mark/sweep garbage collector. A list of allocated heap segments is maintained in the file. The application stops when garbage collection tarts. Heap segments are conservatively scanned to locate pointers, values corresponding to addresses of allocated heap segments. The heap segments pointed to by pointers are marked on the list as accessible. The list is scanned and all unmarked heap segments on the list are considered inaccessible. The memory manager is instructed to deallocate the unmarked, inaccessible heap segments. The marked heap segments on the list are cleared, the deallocated heap segments are removed from the list, and the application resumes.

It is an object of the present invention to provide a method for dynamic memory management without recompiling or relinking to the application.

It is a further object of the present invention to provide a method for dynamic memory management in large scale information retrieval systems.

DETAILED DESCRIPTION OF THE PREFERRED EMBODIMENT

Figure 1:
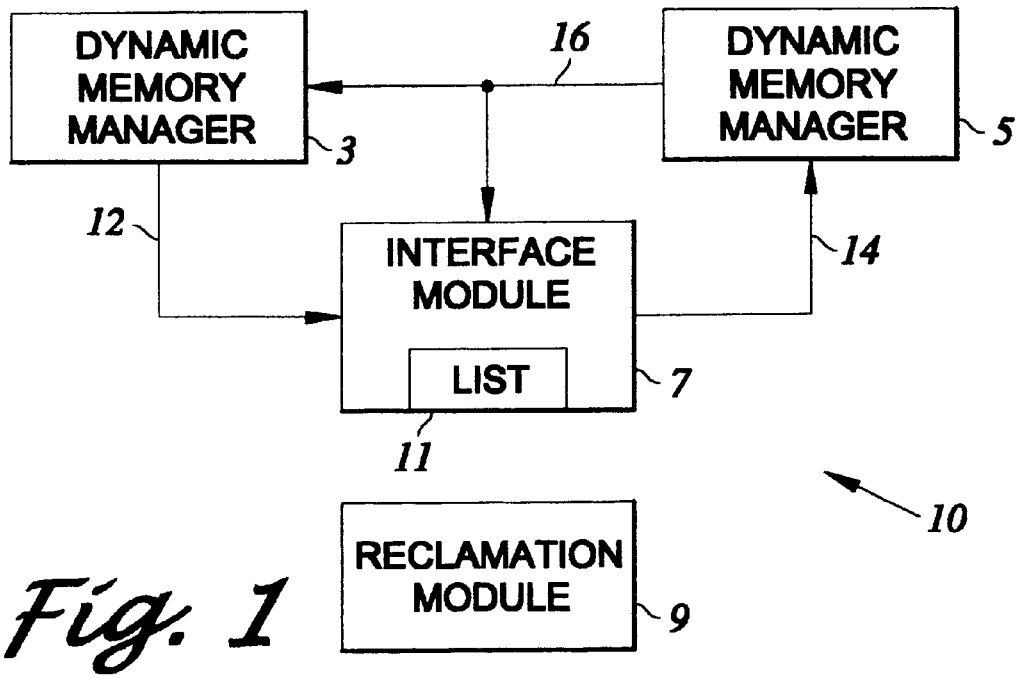
FIG. 1 represents an embodiment of the memory reclamation system of the present invention while an application program is running.

In a computer system, an application which dynamically allocates memory will send a request to the memory manager when it needs to allocate something to a heap segment, or to deallocate a heap segment. Referring to FIG. 1, in an embodiment of the system 10 of the present invention, this request 12 is intercepted by an interface module 7 that emulates the interfaces of the memory manager 5. The application performs just as it would if the request was not intercepted. The interface module 7 forwards the request 14 to the memory manager 5, which performs the requested allocation or deallocation. The memory manager 5 performs just as it would if the request came directly from the application.

When the allocation or deallocation is completed, the memory manager 5 sends allocation/deallocation information 16 to the interface module 7 and to the application 3. The allocation/deallocation information 16 comprises the address and length of the heap segment. The interface module 7 uses the allocation/deallocation information to update a list of allocated heap segments 11. Allocated heap segments are added to the list and deallocated heap segments are removed from the list. The list is continuously updated while the application is running.

In a computer running an OpenVMS operating system, the memory manager would normally send the allocation/deallocation information to a module called the Heap Analyzer. The Heap Analyzer is a tool that presents application memory allocations to a programmer to identify areas where memory usage and performance can be improved. When the system of the present invention is implemented in OpenVMS, the interface module 7 replaces the Heap Analyzer and receives the allocation/deallocation information 16 from the memory manager 5. The system of the present invention may be implemented in a computer running a different operating system, e.g., Unix or Windows NT, by creating an interface module containing procedures that intercept all the memory manager routines.

Figure 2:
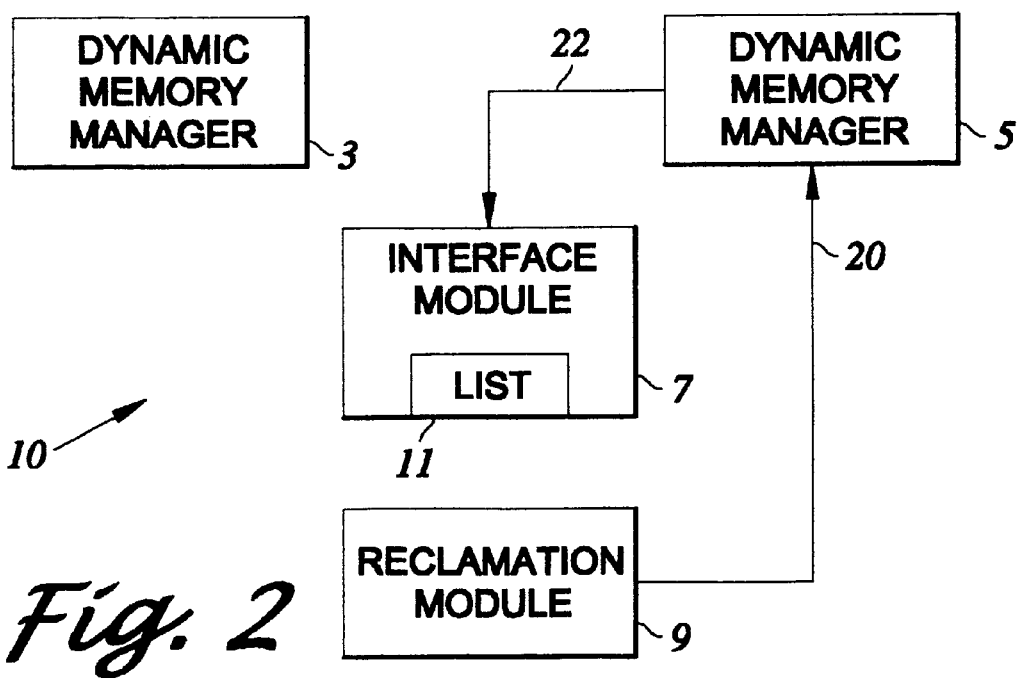
FIG. 2 is a further representation of an embodiment of the system of the present invention while a conservative garbage collection process is running.

A signal from the operating system scheduler tells the garbage collection algorithm to begin and the application program halts while the garbage collector runs. Referring now to FIG. 2, the garbage collection process is performed by the reclamation module 9. The process detects inaccessible heap segments using the list of allocated heap segmenst 11 maintained by the interface module 7. The reclamation module 9 sends a request 20 to the memory manager 5 to deallocate the inaccessible heap segments. The memory manager 5 performs this function and sends the deallocation information 22 to the interface module 7. The interface module 7 then removes the deallocated heap segments from the list 11. Once this process is complete, the application 3 resumes and the system operates as described in reference to FIG. 1. Thus inaccessible heap segments are reclaimed without recompiling or relinking the application, since the application is blind to the garbage collection process and that process is conservative.

Halting an application for periods of garbage collection works well for applications with soft deadlines, e.g. information retrieval systems. However, real-time applications with hard deadlines cannot permit garbage collection in one action preempting application execution. To be suitable for real-time applications, the system may interleave small units of garbage collection with small units of application execution. Such an design choice is within the scope of the present invention.

Figure 3:
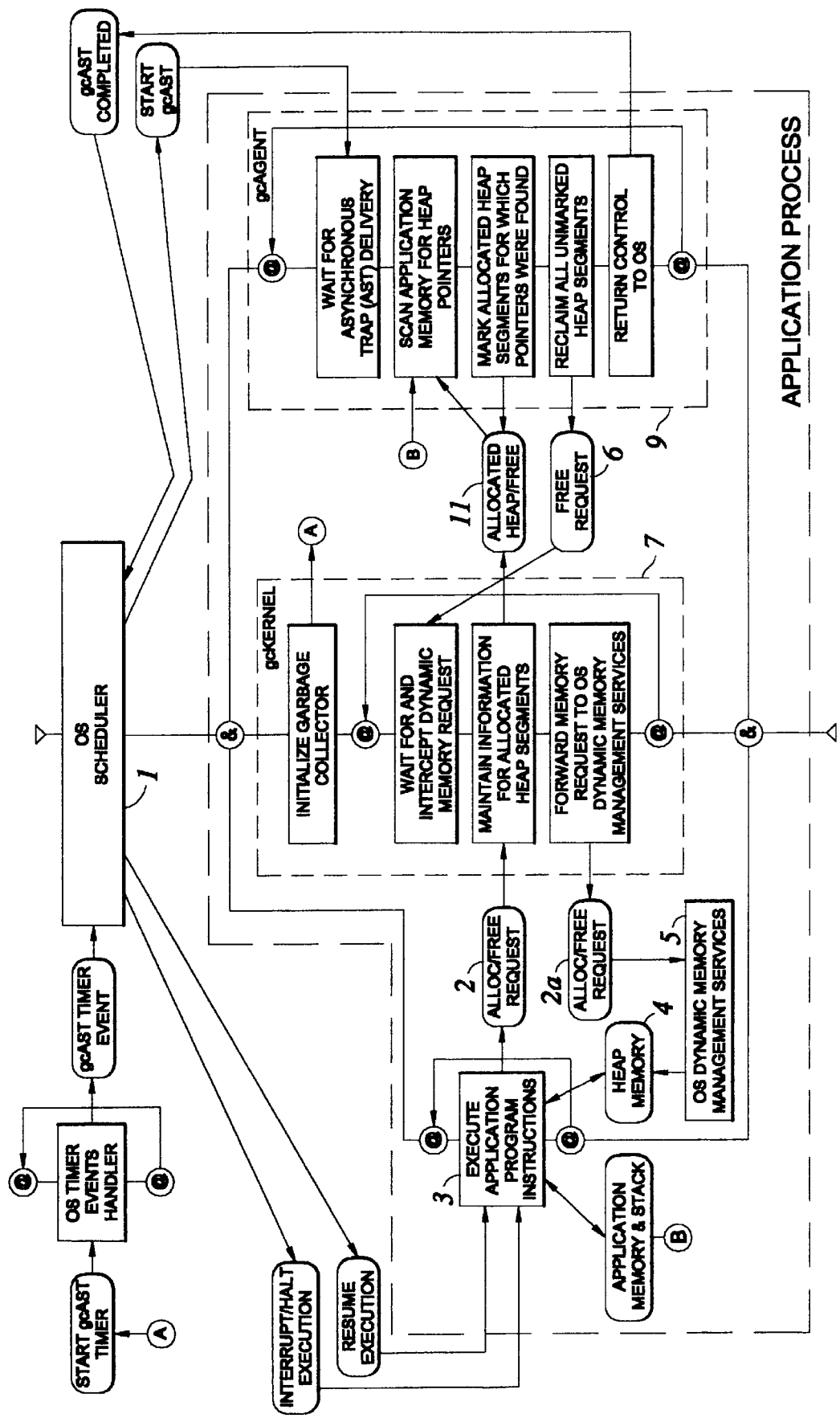
FIG. 3 is a flow diagram that represents the preferred embodiment of the memory reclamation method of the present invention.

Referring now to FIG. 3, the preferred embodiment of the method of the present invention is described. While an application program 3 is running, it sends out allocation and deallocation requests 2. In the present method, these requests 2 are intercepted by an interface module 7. This module forwards the request 2a to the dynamic memory manager 5. The memory manager 5 performs the requested allocation or deallocation, and sends the resulting allocation/deallocation information 4 to the application 3 and back to the interface module 7. The interface module 7 maintains this information in a list of allocated heap segments 11. Allocated heap segments are added to the list and deallocated heap segments are removed from the list. These steps continue until the operating system scheduler signals the start of the garbage collection process and the halt of the application.

In the preferred embodiment of the present method, the garbage collection process comprises a conservative mark/sweep process. The mark/sweep process of the present invention differs from the traditional mark/sweep method by not delaying reclamation until all available heap storage is exhausted, nor does it reclaim garbage immediately. Instead, the process operates on a periodic reclamation cycle. The mark/sweep process has two main steps. The mark step partitions all allocated heap segments into two sets, accessible heap segments and inaccessible heap segments. The sweep step then frees all inaccessible heap segments for reuse by the application.

At a signal from the operating system scheduler 1, the process begins with the mark step, in which the reclamation module 9 scans the user stack, statically allocated memory, and accessible allocated heap segments for pointers. The reclamation module only scans these three areas of memory because it is assumed that pointers reside in memory that is accessible to the active application. Accessible allocated heap segments are scanned because they may contain pointers to other allocated heap segments. Each memory location in these areas is checked to determine if its value corresponds to an address within the bounds of an allocated heap segment, i.e. whether the value could be a pointer. The scan is conservative, in that the reclamation module receives no assistance from the compiler to determine whether a value is a pointer. Any word that could be a pointer (value equal to an address of an allocated heap segment) is treated like a pointer. An allocated heap segment that is pointed to by a pointer is considered accessible. Since the scan is conservative, it is possible that some inaccessible locations will be marked as accessible. Even so, the conservative scan works well since in practice the likelihood of properly aligned values having bit patterns of pointers is low.

Each accessible allocated heap segment is marked as such on the list of allocated heap segments 11. In the preferred embodiment, the list comprises a red-black binary tree structure that has a node for each allocated heap segment. Each node contains information about a heap segment including address, size, and a liveness mark if the heap segment is accessible.

The reclamation module then performs the sweep step, which frees the inaccessible heap segments. In the preferred embodiment the sweep step separates the marked and unmarked nodes in the binary tree, wherein the unmarked nodes correspond to inaccessible heap segments. Each node is visited in turn, and the addresses of all of the unmarked nodes are pushed onto the stack and the marked nodes are cleared. After all the nodes have been visited, the addresses of the unmarked heap segments are popped off the stack and the reclamation module sends a request 6 to the interface module to deallocate these inaccessible heap segments, thus reclaiming the memory leaks without rebuilding (recompiling or relinking) the application. The interface module forwards this request to the dynamic memory manager. It is unknown to the memory manager from where it is invoked, so it operates as if the application had called it to deallocate heap segments. The deallocation information generated by the memory manager is sent to the interface module. The nodes corresponding to the deallocated heap segments are removed from the list of allocated heap segments, the garbage collection process halts, and the application resumes.

During the garbage collection process, the reclamation module records accessible and inaccessible heap segments that are detected. At the start of the process, the reclamation module records a time stamp in a log file. During the mark step, as pointers are found, an entry is made in the log file which records the accessible heap segment address, size, and mark, the pointer value and the program counter of the instruction in the application that allocated the heap segment.

During the sweep step, as inaccessible heap segments are identified, an entry is made in the log file which records the inaccessible heap segment address, size, and mark, the start address of the heap segment and the program counter of the instruction in the application that allocated the heap segment. At the end of the garbage collection process, the reclamation module records the number of inaccessible heap segments detected during the process.

The time cost of the mark step of the garbage collection process is proportional to the number of memory locations in the stack, statically allocated data, and accessible allocated heap segments, since each location must be scanned for pointers. The time cost of the sweep step is proportional to the total number of allocated heap segments, since each allocated heap segment has a node on the list that must be visited. The total time cost is the sum of the costs of the mark and the sweep steps, and depends on the processing speed of the computer.

In the preferred embodiment, the garbage collection process is performed periodically, for example every 10 seconds. During initialization the reclamation module requests the operating system to schedule the garbage collection process every 10 seconds. The periodicity of the garbage collection process may be adjusted without going beyond the scope of the present invention.

It is to be understood that the described embodiments are merely illustrative of the many specific embodiments which represent applications of the present invention. Other embodiments may be readily devised by those skilled in the art without departing from the spirit and scope of the present invention.

What is claimed is:

1. A method for dynamic memory reclamation in a computer having a memory containing a heap, and at least one of an operating system with a dynamic memory manager, and a language runtime environment with a dynamic memory manager, wherein an application program sends requests for memory allocation and deallocation to the dynamic memory manager, said method comprising the steps of:

a) emulating the interfaces of the dynamic memory manager by an interface module, the interface module being disposed separate from and operating independent of the application program;

b) intercepting a request for memory allocation or deallocation from the application to the dynamic memory manager by the interface module;

c) generating a request that is transmitted from the interface module to the memory manager, as if sent directly from the application, which then performs the application's requested memory allocation or deallocation, wherein memory allocation/deallocation information is created;

d) communicating the memory allocation/deallocation information to the interface module;

e) maintaining a list of allocated heap memory segments from the allocation/deallocation information in the interface module;

f) performing a conservative garbage collection process, without rebuilding the application program, using the list of allocated heap memory segments in the interface module to detect inaccessible heap memory segments;

g) receiving a request for memory deallocation from a reclamation module by the interface module;

h) generating a request that is transmitted from the interface module to the memory manager, as if sent directly from the reclamation module to deallocate the inaccessible heap segments;

i) deallocating the heap segments in the dynamic memory manager, wherein memory allocation/deallocation information is created;

j) communicating the memory allocation/deallocation information back to the interface module; and k) updating the list of allocated heap memory segments in the interface module.

2. The method of claim 1 wherein the garbage collection process is performed periodically.

3. The method of claim 1 wherein the conservative garbage collection process comprises a conservative mark/sweep garbage collection process.

4. The method of claim 3 wherein the conservative mark/sweep garbage collection process comprises the steps of:

a) locating memory locations that contain values that correspond to addresses of allocated heap memory segments, wherein each address conservatively identifies an accessible allocated heap memory segment;

b) marking each accessible allocated heap memory segment on the list of allocated heap memory segments;

c) scanning the list of allocated heap memory segments; and d) identifying unmarked heap memory segments as inaccessible heap memory segments.

5. A dynamic memory reclamation system in a computer having a memory, and at least one of an operating system with a dynamic memory manager and a language runtime environment with a dynamic memory manager, wherein an application program sends request to the dynamic memory manger to allocate and deallocate heap segments, said reclamation system comprising:

a) an interface module that intercepts the requests from an application and forwards the request to the dynamic memory manager, the interface module being disposed separate from and operating independent of the application program;

b) memory allocation and deallocation information generated by the dynamic memory manager in response to the requests, the memory allocation and deallocation information being sent to the interface module and to the application;

c) a list of allocated heap segments maintained in the interface module;

d) a reclamation module, which performs a conservative garbage collection process using the list of allocated heap segments to detect inaccessible heap segments, and sends a deallocation request to the interface module to deallocate the inaccessible heap segments, wherein the interface module forwards the deallocation request to the dynamic memory manager, the dynamic memory manager communicates back to the interface module, the allocation/deallocation information, and the interface module then updates the list of allocated heap segments, whereby the inaccessible heap segments are reclaimed without rebuilding the application program.

6. The dynamic memory management system of claim 5 wherein the conservative garbage collection process comprises a conservative mark/sweep garbage collector.

7. The dynamic memory management system of claim 5 wherein the reclamation module performs the conservative garbage collection process periodically.

* * * * *